Patented Jan. 11, 1949

2,458,585

UNITED STATES PATENT OFFICE 2,458,585

AMINOPYRIDINE COMPOUNDS

Harris L. Friedman, New York, and Leo D. Braitberg, Yonkers, N. Y., assignors to Pyridium Corporation, Yonkers, N. Y., a corporation of New York No Drawing. Application June 29, 1945, Serial No. 602,405

6 Claims. (Cl. 260—296)

Our invention relates to and has for its object, new chemical compounds which are more stable than the original base and hence are useful as intermediates in the production of dyes and other compounds, and some of which have therapeutic properties and are useful for devitalizing bacteria and rendering them harmless or innocuous.

While the basic compounds from which we have formed the new therapeutic compounds of our invention have therapeutic properties, their physical and chemical properties are such as to render their proper application somewhat difficult and they require considerable care in their successful application.

These basic compounds are generally oily liquids, or low melting solids, practically insoluble in water and are somewhat unstable, coloring upon standing, and the decomposition product may be toxic and deleterious, and their acid salts are generally too acid for injection purposes.

One of the objects of our invention, therefore, is to produce new compounds which, while possessing therapeutic properties, will have none of the mentioned, and other, disadvantages of the corresponding basic compounds.

We have found that the alkali methylene sulphinate salts of these basic compounds possess highly therapeutic values over those of their corresponding basic compounds.

These therapeutic compounds of our invention are dry, stable powders and hence they can be administered in combination with food, in capsules, in tablet form, or parenterally injected in the form of a solution, and they, therefore, possess highly valuable physical, stable and administrative properties over their corresponding basic compounds.

We have found further, that these therapeutic compounds of our invention are particularly valuable in their effectiveness against Mycobacterium tuberculosis, although their usefulness is not limited to that particular disease, and that this effectiveness in the treatment of disease is greater than that possessed by the corresponding basic compounds.

We have found, further, that these therapeutic compounds of our invention are less toxic than the corresponding basic compounds, and that they also possess the additional unexpected property of being practically unaffected in their anti-bacterial action in the presence of such biological inhibitory substances as p-aminobenzoic acid, peptones, serum, pus, etc., which are present in living organisms, which substances seriously reduce the effectiveness of other compounds.

This action of these therapeutic compounds of our invention against Mycobacterium tuberculosis is particularly unexpected and remarkable as they are relatively without effect against other pathogenic organisms such as $E.$ $coli.$, $Staphylococcus$ $aureus$ and $Streptococcus$ $pyogenes$.

Further, substances which were hitherto known to have activity against Mycobacterium tuberculosis, such as certain sulfonamide and related compounds, are greatly, if not completely, inhibited in the presence of biological inhibitory substances, which is known to account for the lack of sufficient tuberculosis activity of those previously known compounds.

Some of the inhibitory substances which are present in the human organism include para-aminobenzoic acid, serum, peptones, pus and other protein degradation products which have high content of inhibitory substances. Some of these inhibitory substances in the lesions of tuberculosis and other diseases, which produce large amounts of tissue breakdown, play a very important role in the inhibition of sulfonamide and sulfone compounds, and as a result of this inhibitory mechanism, therapeutic trials on the whole failed.

The activity of therapeutic compounds of our invention against Mycobacterium tuberculosis is not diminished, when p-aminobenzoic acid, peptones, serum, pus, etc., are present. We have found that these compounds of our invention inhibit the growth of various strains of tuberculosis organisms in various dilutions, some diluted as high as one part to 25 million, depending upon the medium and strain of tuberculosis organism used.

As these inhibitory substances are present in the tubercular host, it is impossible to produce the desired therapeutic effect with sulfonamide and sulfone compounds, and hence any compounds which would practically retain their bacteriaostatic properties irrespective of the inhibitory substances present would be of the highest value.

This property of the therapeutic compounds included within our invention of being practically uninhibited in bacteriostatic effectiveness, and especially in bacteriostatic effect against Mycobacterium tuberculosis, is entirely unexpected and cannot be predicated upon any prior knowledge relative to previously known bacteriostatic compounds, and is of the greatest importance and value in the treatment of infection.

By "inhibitory substances" in our specification and claims, we mean those substances which prevent the bacteriostatic action normally manifested by compounds in their absence, but which do not inhibit the bacteriostatic activities of the therapeutic compounds of our invention.

We have found that when adequate precautions are taken to administer our compounds in such a manner and with such frequency as to insure a desired concentration of the respective compounds in the blood stream, they are effective in the treatment of tuberculosis.

Another advantage of the compounds of our invention is that following administration by whatever route chosen, concentration of the respective compounds in the blood of the recipient animals are higher and can be maintained with greater safety than is possible with the corresponding basic compounds.

The general formula of the compounds of our invention is

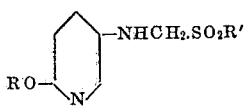

in which R represents a member of the group consisting of alkyl radicals and alkoxy alkyl radicals having not more than eight carbon atoms such as ethyl-, propyl-, butyl-, amyl-, hexyl-, heptyl-, octyl-, isopropyl-, isobutyl-, secondary butyl-, tertiary butyl-, isoamyl-, diethylmethyl-, dipropylmethyl-, allyl-, alkoxyalkyl radicals such as methoxyethyl-, ethoxyethyl-, or butoxyethyl-, or saturated or unsaturated aryl radicals such as phenyl-, naphthyl-, benzyl-, betapyridyl-, furfuryl-, p-aminophenyl-, p-aminobenzyl-, cyclohexyl-, tetrahydrofurfuryl-, phenyloxyethyl-, and benzyloxyethyl-, and R' is an alkali metal.

The general formula for the basic compounds from which we produce the compounds of our invention is

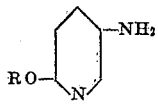

in which R represents a member of the group consisting of alkyl radicals and alkoxyalkyl radicals having not more than eight carbon atoms, and aryl radicals.

The chemical reaction of the process is the following:

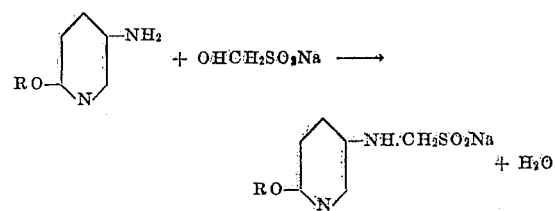

In producing our new compounds we react the free amine of the basic compounds dissolved in alcohol, or other suitable inert solvent, with an alkali metal salt of formaldehyde sulfoxylate, such as sodium methylene-sulfinate or potassium methylene-sulfinate.

The following are examples of our processes for the production of the indicated compounds of our invention.

Example I 206 grams freshly distilled 2-butoxy, 5-aminopyridine were dissolved in 320 ccs. of isopropanol in a 5 liter flask and 206 grams of finely pulverized sodium formaldehyde sulfoxylate were added. The reaction mixture was refluxed under continuous stirring for 5½ hours. The mixture at the beginning was quite mobile, but toward the end of the reactions became quite heavy with a voluminous white precipitate. It was then allowed to stand over night without stirring, the flask being well covered for insulation. During the following morning the reaction mixture was cooled and centrifuged in 250 cc. centrifuge bottles. The material so collected was suspended in acetone and centrifuged again. Each lot was washed twice with acetone. The collected moist material was then spread out on glass plates and dried in a vacuum desiccator over calcium chloride. The dry product is a light yellow, fluffy powder, and is very soluble in water. The formula of the product thus formed is $C_4H_9O \cdot C_5H_3N \cdot NHCH_2 \cdot SO_2Na$ 2-butoxy, 5-aminopyridine sodium methylene sulfinate.

Example II 2.11 grams of 2-ethoxy, 5-aminopyridine dihydrochloride were dissolved in water and sodium hydroxide solution was added until an alkaline reaction was produced. The free amine thus formed was extracted with ether, the ether solution dried with anhydrous sodium sulfate and evaporated. The free base is of light orange color. This base was dissolved in 30 ccs. isopropanol, heated to 70° C. and 1.8 grams finely pulverized sodium formaldehyde sulfoxylate were added, and kept at that temperature under stirring for 2½ hours. In about a half hour the color changed to canary yellow. After the mixture had stood over night it was centrifuged, the yellow powder was twice reslurried in acetone and centrifuged, and then placed into a vacuum desiccator and dried. The product thus formed is 2-ethoxy, 5-aminopyridine sodium methylene sulfinate.

Example III 3.6 grams of 2-hexyloxy, 5-aminopyridine, a red oil, were made from the dihydrochloride and treated in 55 ccs. isopropanol with 3.1 grams finely powdered sodium formaldehyde sulfoxylate, and processed as explained in Example II. The product thus formed is 2-hexyloxy, 5-aminopyridine sodium methylene sulfinate.

Example IV

The free base was prepared from 2.95 grams 2-n-octyloxy, 5-aminopyridine dihydrochloride and treated with 2 grams of sodium formaldehyde sulfoxylate as explained in Example II. The product 2-n-octyloxy, 5-aminopyridine sodium methylene sulfinate forms a canary yellow powder.

Example V 4 grams 2-diethylmethoxy, 5-aminopyridine dihydrochloride were dissolved in water, neutralized with sodium hydroxide solution and the free amine extracted with ether. The ether solution was dried with anhydrous sodium sulfate and then evaporated in vacuo. The free amine thus formed was then dissolved in 40 ccs. isopropanol and 2.6 grams finely pulverized sodium formaldehyde sulfoxylate were added. It was refluxed in a water bath for one hour and then allowed to stand at room temperature over night. During the next day it was reheated to 80–90° C.

then cooled and centrifuged. The pasty product was washed three times by suspension in acetone and centrifuged. The dry product, 2-diethyl methoxy, 5 aminopyridine sodium methylene sulfinate forms a yellow powder.

Example VI 2.8 grams of 2-allyloxy, 5-aminopyridine were made from the dihydrochloride and the dry amine thus formed was dissolved in 55 ccs. of isopropanol. 2.4 grams sodium formaldehyde sulfoxylate were then added and the mixture refluxed for 5½ hours under stirring. After cooling, the mixture was centrifuged, and the yellow reaction product was purified by suspension and centrifuging twice in acetone. The dried product is 2-allyloxy, 5-aminopyridine sodium methylene sulfinate.

Example VII 2.3 grams of 2-methoxyethoxy, 5-aminopyridine were treated in 45 ccs. isopropanol with 2.7 grams of sodium formaldehyde sulfoxylate by the method set forth in Example VI. The resulting light yellow colored product is 2-methoxyethoxy, 5-aminopyridine sodium methylene sulfinate.

Example VIII 2.7 grams of 2-cyclohexyloxy, 5-aminopyridine, prepared from the dihydrochloride were treated in 45 ccs. isopropanol with 1.2 grams finely pulverized sodium formaldehyde sulfoxylate in accordance with the process of Example VI refluxing, however, only for 4½ hours. The resulting light yellow colored product is 2-cyclohexyloxy, 5-aminopyridine sodium methylene sulfinate.

Example IX 3.0 grams of 2-phenyloxyl, 5-aminopyridine dihydrochloride were converted into the free base and treated in 30 ccs. isopropanol with 2.0 grams of finely pulverized sodium formaldehyde sulfoxylate at 75° C. for 5 hours and processed as in Example II. The product is 2-phenyloxy, 5-aminopyridine sodium methylene sulfinate.

Example X 2.0 grams 2-betapyridyloxy, 5-aminopyridine were dissolved in 25 ccs. isopropanol, and refluxed, after adding 2.0 grams finely pulverized sodium formaldehyde sulfoxylate, for 5 hours. The mixture was cooled, centrifuged, and washed twice with acetone by suspension and centrifuging. The pasty residue was collected and dried in a vacuum desiccator. The dried yellow powder is 2-betapyridyloxy, 5-aminopyridine sodium methylene sulfinate.

The products formed as described in the foregoing examples are similar in their characteristics. They are slightly yellow to bright yellow colored products and are all very soluble in water and no free amine is present.

The activity of some of the compounds included in our invention against Mycobacterium tuberculosis are tabulated below. The figures indicate the highest dilution that still inhibits the growth of Mycobacterium tuberculosis under a particular set of experimental conditions as regards inoculum, culture, etc., thereby making a comparable series.

| Name of compound | Highest dilution showing Bacteriostasis |
|---|---|
| 2-butoxy, 5-aminopyridine sodium methylene sulfinate | 1/1,600,000 |
| 2-ethoxy, 5-aminopyridine sodium methylene sulfinate | 1/25,000 |
| 2-hexyloxy, 5-aminopyridine sodium methylene sulfinate | 1/1,600,000 |
| 2-n-octyloxy, 5-aminopyridine sodium methylene sulfinate | 1/12,500 |
| 2-diethylmethyloxy, 5-aminopyridine sodium methylene sulfinate | 1/800,000 |
| 2-allyloxy, 5-aminopyridine sodium methylene sulfinate | 1/100,000 |
| 2-methoxyethoxy, 5-aminopyridine sodium methylene sulfinate | 1/100,000 |
| 2-cyclohexyloxy, 5-aminopyridine sodium methylene sulfinate | 1/6250 |
| 2-phenyloxy, 5-aminopyridine sodium methylene sulfinate | 1/6250 |
| 2-betapyridyloxy, 5-aminopyridine sodium methylene sulfinate | 1/6250 |

The therapeutic compounds of our invention, therefore, present highly valuable and unexpected bacteriostatic properties especially against such bacteria as cause tubercular infections, although their usefulness is not limited to that particular disease.

We do not confine ourselves to the specific limitations mentioned, as these are given solely for the purpose of clearly describing our invention as set forth herein.

What we claim is:

1. Compounds having the general formula:

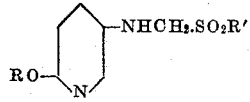

in which R is a member of the group consisting of alkyl radicals and alkoxyalkyl radicals having not more than eight carbon atoms and aryl radicals and R' is an alkali metal.

2. Compounds having the general formula:

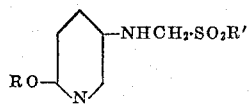

in which R is a member of the group consisting of alkyl radicals having not more than eight carbon atoms and in which R' is an alkali metal.

3. Compounds having the general formula:

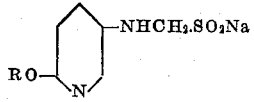

in which R is a member of the group consisting of alkyl radicals and alkoxyalkyl radicals having not more than eight carbon atoms and aryl radicals.

4. 2-butoxy, 5-aminopyridine sodium methylene sulfinate.

5. 2-hexyloxy, 5-aminopyridine sodium methylene sulfinate.

6. 2-diethylmethyloxy, 5-aminopyridine sodium methylene sulfinate.

HARRIS L. FRIEDMAN.
LEO D. BRAITBERG.

(No references cited.)